United States Patent
Kuan et al.

(10) Patent No.: US 8,446,133 B2
(45) Date of Patent: May 21, 2013

(54) METHODS AND CONTROL CIRCUITS FOR CONTROLLING BUCK-BOOST CONVERTING CIRCUIT TO GENERATE REGULATED OUTPUT VOLTAGE UNDER REDUCED AVERAGE INDUCTOR CURRENT

(75) Inventors: Chien-Wei Kuan, Hsinchu (TW); Yen-Hsun Hsu, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 660 days.

(21) Appl. No.: 12/684,118

(22) Filed: Jan. 8, 2010

(65) Prior Publication Data
US 2011/0169466 A1    Jul. 14, 2011

(51) Int. Cl.
*G05F 1/59*    (2006.01)
(52) U.S. Cl.
USPC .......................................... 323/271; 323/283
(58) Field of Classification Search
USPC ................... 323/222, 225, 271, 283
See application file for complete search history.

(56) References Cited

U.S. PATENT DOCUMENTS

| | | | | |
|---|---|---|---|---|
| 5,734,258 A * | 3/1998 | Esser | | 323/224 |
| 6,166,527 A | 12/2000 | Dwelley | | |
| 7,221,130 B2 * | 5/2007 | Ribeiro et al. | | 323/271 |
| 7,242,168 B2 * | 7/2007 | Muller et al. | | 323/222 |
| 7,391,190 B1 * | 6/2008 | Rajagopalan | | 323/271 |
| 7,495,423 B1 * | 2/2009 | Knight et al. | | 323/284 |
| 7,723,965 B2 * | 5/2010 | Lesso et al. | | 323/225 |
| 7,843,177 B2 * | 11/2010 | Ho et al. | | 323/222 |
| 7,863,872 B2 * | 1/2011 | Chiu | | 323/271 |
| 7,977,928 B2 * | 7/2011 | Fahrenbruch et al. | | 323/271 |
| 7,994,762 B2 * | 8/2011 | de Cremoux et al. | | 323/271 |
| 8,143,865 B2 * | 3/2012 | Grant | | 323/222 |
| 8,269,471 B2 * | 9/2012 | Singnurkar | | 323/259 |
| 8,274,266 B2 * | 9/2012 | Engelhardt et al. | | 323/259 |
| 8,305,055 B2 * | 11/2012 | Wu et al. | | 323/259 |
| 2006/0145672 A1 * | 7/2006 | Kernahan et al. | | 323/271 |
| 2006/0284606 A1 | 12/2006 | Chen | | |
| 2008/0136387 A1 * | 6/2008 | Bertele | | 323/282 |
| 2009/0039841 A1 * | 2/2009 | Fabbro | | 323/271 |
| 2009/0102440 A1 * | 4/2009 | Coles | | 323/271 |
| 2009/0102441 A1 * | 4/2009 | de Cremoux et al. | | 323/271 |
| 2009/0108820 A1 * | 4/2009 | Mirea | | 323/271 |
| 2009/0146623 A1 | 6/2009 | de Cremoux | | |

(Continued)

FOREIGN PATENT DOCUMENTS

AT    505 734 A1    3/2009
CN    101340142 A    1/2009

(Continued)

*Primary Examiner* — Jeffrey Sterrett
(74) *Attorney, Agent, or Firm* — Winston Hsu; Scott Margo

(57) ABSTRACT

A method of controlling a buck-boost converting circuit is provided. The buck-boost converting circuit has an inductive element, a first conduction controlling element, a second conduction controlling element, a third conduction controlling element, and a fourth conduction controlling element. The method includes: controlling the first and third conduction controlling elements to be electrically conductive and the second and fourth conduction controlling elements to be electrically nonconductive according to a first duty setting; determining a second duty setting whose generation is independent of that of the first duty setting; controlling the first and fourth conduction controlling elements to be electrically conductive and the second and third conduction controlling element to be electrically nonconductive according to the second duty setting; and controlling the second and fourth conduction controlling elements to be electrically conductive and the first and third conduction controlling elements to be electrically nonconductive according to a third duty setting.

26 Claims, 8 Drawing Sheets

U.S. PATENT DOCUMENTS

| | | |
|---|---|---|
| 2009/0295343 A1 | 12/2009 | Chiu |
| 2010/0019745 A1* | 1/2010 | Keskar et al. .................. 323/271 |
| 2010/0231189 A1* | 9/2010 | Chen et al. .................... 323/284 |
| 2011/0089915 A1* | 4/2011 | Qiu et al. ....................... 323/271 |
| 2011/0156683 A1* | 6/2011 | Zhang et al. .................. 323/283 |
| 2011/0169466 A1* | 7/2011 | Kuan et al. .................... 323/282 |
| 2012/0032658 A1* | 2/2012 | Casey et al. ................... 323/271 |
| 2012/0049810 A1* | 3/2012 | Huang et al. .................. 323/271 |
| 2012/0049818 A1* | 3/2012 | Hester ........................... 323/282 |
| 2012/0074916 A1* | 3/2012 | Trochut ......................... 323/271 |
| 2012/0146602 A1* | 6/2012 | Chen et al. .................... 323/282 |
| 2012/0262142 A1* | 10/2012 | Chen et al. .................... 323/284 |

FOREIGN PATENT DOCUMENTS

| | | |
|---|---|---|
| DE | 100 54 339 A1 | 5/2002 |
| EP | 2009776 A1 | 12/2008 |
| WO | 2009000901 A1 | 12/2008 |

* cited by examiner

METHODS AND CONTROL CIRCUITS FOR CONTROLLING BUCK-BOOST CONVERTING CIRCUIT TO GENERATE REGULATED OUTPUT VOLTAGE UNDER REDUCED AVERAGE INDUCTOR CURRENT

BACKGROUND

The disclosed embodiments of the present invention relate to generating a regulated output voltage, and more particularly, to methods and control circuits for controlling a buck-boost converting circuit to generate a regulated output voltage under a reduced average inductor current.

A conventional regulator is employed for providing a regulated output voltage according to an input voltage. FIG. 1 is a diagram illustrating a conventional buck-boost converting circuit 100. The buck-boost converting circuit 100 is for generating a regulated output voltage V_OUT according to an input voltage V_IN, and includes an input capacitor 102, an inductor 104, an output capacitor 106, and a plurality of switches SW_A, SW_B, SW_C, and SW_D, where the voltage difference between one terminal of the input capacitor 102 and the ground terminal GND is the input voltage V_IN, and the voltage difference between one terminal of the output capacitor 106 and the ground terminal GND is the regulated output voltage V_OUT. The conventional regulator control switches on (turns on) the switches SW_A and SW_C together and switches on (turns on) the switches SW_B and SW_D together, alternately. That is to say, switches SW_A and SW_C are switched on when switches SW_B and SW_D are switched off, and switches SW_A and SW_C are switched off when switches SW_B and SW_D are switched on. In this way, the regulated output voltage V_OUT and the input voltage VIN would have the following transfer function: V_OUT/V_IN=D/(1−D), where D represents the turn-on duty of the switches SW_A and SW_C.

FIG. 2 is a waveform diagram illustrating the inductor current $I_{ind}$ of the inductor 104 and the current ID of the switch SW_D. As the switch SW_D is only turned on according to the turn-on duty (1−D), the average inductor current should be high enough to supply the desired output current to an output load (not shown). As can be seen from FIG. 2, the peak inductor current is very high, which is undesirable as the switches, the direct-current resistance (DCR) of the inductor, and/or other parasitic resistance in the current path would consume much power. Specifically, the relation between the average inductor current $I_{AVG,\ L}$ of the inductor 104 and the average current $I_{AVG,\ SW\text{-}D}$ of the switch SW_D can be expressed using the following equation: $I_{AVG,\ SW\text{-}D}=I_{AVG,\ L}*(1-D)$. In a case where V_OUT/V_IN=3.3V/3.3V, and the required output current is 300 mA, the turn-on duty D is about 50%, and the average inductor current $I_{AVG,\ L}$ will be about 600 mA, which is twice as large as the average output current 300 mA. However, the large average inductor current will result in large conversion efficiency loss.

Thus, there is a need for an innovative regulator control design to make a buck-boost converting circuit generate a regulated output voltage under a reduced average inductor current.

SUMMARY

In accordance with exemplary embodiments of the present invention, methods and control circuits for controlling a buck-boost converting circuit to generate a regulated output voltage under a reduced average inductor current are disclosed.

According to a first aspect of the present invention, a method of controlling a buck-boost converting circuit to supply a regulated output voltage at an output node of the buck-boost converting circuit is provided. The buck-boost converting circuit includes an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node. The method includes: controlling the first conduction controlling element and the third conduction controlling element to be electrically conductive and controlling the second conduction controlling element and the fourth conduction controlling element to be electrically nonconductive according to a first duty setting; determining a second duty setting, wherein generation of the second duty setting is independent of generation of the first duty setting; controlling the first conduction controlling element and the fourth conduction controlling element to be electrically conductive and controlling the second conduction controlling element and the third conduction controlling element to be electrically nonconductive according to the second duty setting; and controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

According to a second aspect of the present invention, a method of controlling a buck-boost converting circuit to supply a regulated output voltage at an output node of the buck-boost converting circuit is provided. The buck-boost converting circuit includes an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node. The method includes: controlling the first conduction controlling element and the third conduction controlling element to be electrically conductive and controlling the second conduction controlling element and the fourth conduction controlling element to be electrically nonconductive according to a first duty setting; determining a second duty setting without referring to at least a feedback voltage derived from the regulated output voltage; controlling the first conduction controlling element and the fourth conduction controlling element to be electrically conductive and controlling the second conduction controlling element and the third conduction controlling element to be electrically nonconductive according to the second duty setting; and controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

According to a third aspect of the present invention, a control circuit for controlling a buck-boost converting circuit to supply a regulated output voltage at an output node of the buck-boost converting circuit is provided. The buck-boost converting circuit includes an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node. The control circuit includes: a first control block, operative to determine a first duty setting; a second control block, operative to determine a second duty setting which is independent of the first duty setting determined by the first control block; and a logic circuit, coupled to the first control block and the second control block, for receiving the first duty setting and the second duty setting, controlling the first conduction controlling element and the third conduction controlling element to be electrically conductive and controlling the second conduction controlling element and the fourth conduction controlling element to be electrically nonconductive according to the first duty setting, controlling the first conduction controlling element and the fourth conduction controlling element to be electrically conductive and controlling the second conduction controlling element and the third conduction controlling element to be electrically nonconductive according to the second duty setting, and controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

According to a fourth aspect of the present invention, a control circuit for controlling a buck-boost converting circuit to supply a regulated output voltage at an output node of the buck-boost converting circuit is provided. The buck-boost converting circuit includes an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node. The control circuit includes: a first control block, operative to determine a first duty setting; a second control block, operative to determine a second duty setting without referring to at least a feedback voltage derived from the regulated output voltage; and a logic circuit, coupled to the first control block and the second control block, for receiving the first duty setting and the second duty setting, controlling the first conduction controlling element and the third conduction controlling element to be electrically conductive and controlling the second conduction controlling element and the fourth conduction controlling element to be electrically nonconductive according to the first duty setting, controlling the first conduction controlling element and the fourth conduction controlling element to be electrically conductive and controlling the second conduction controlling element and the third conduction controlling element to be electrically nonconductive according to the second duty setting, and controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

According to a fifth aspect of the present invention, a method of controlling a buck-boost converting circuit is provided. The buck-boost converting circuit supplies a regulated output voltage at an output node and includes an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node. The method includes determining a first duty setting according to current flowing through the first conduction controlling element or the inductive element; controlling the first conduction controlling element and the third conduction controlling element to be electrically conductive and controlling the second conduction controlling element and the fourth conduction controlling element to be electrically nonconductive according to the first duty setting; determining a second duty setting; controlling the first conduction controlling element and the fourth conduction controlling element to be electrically conductive and controlling the second conduction controlling element and the third conduction controlling element to be electrically nonconductive according to the second duty setting; and controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
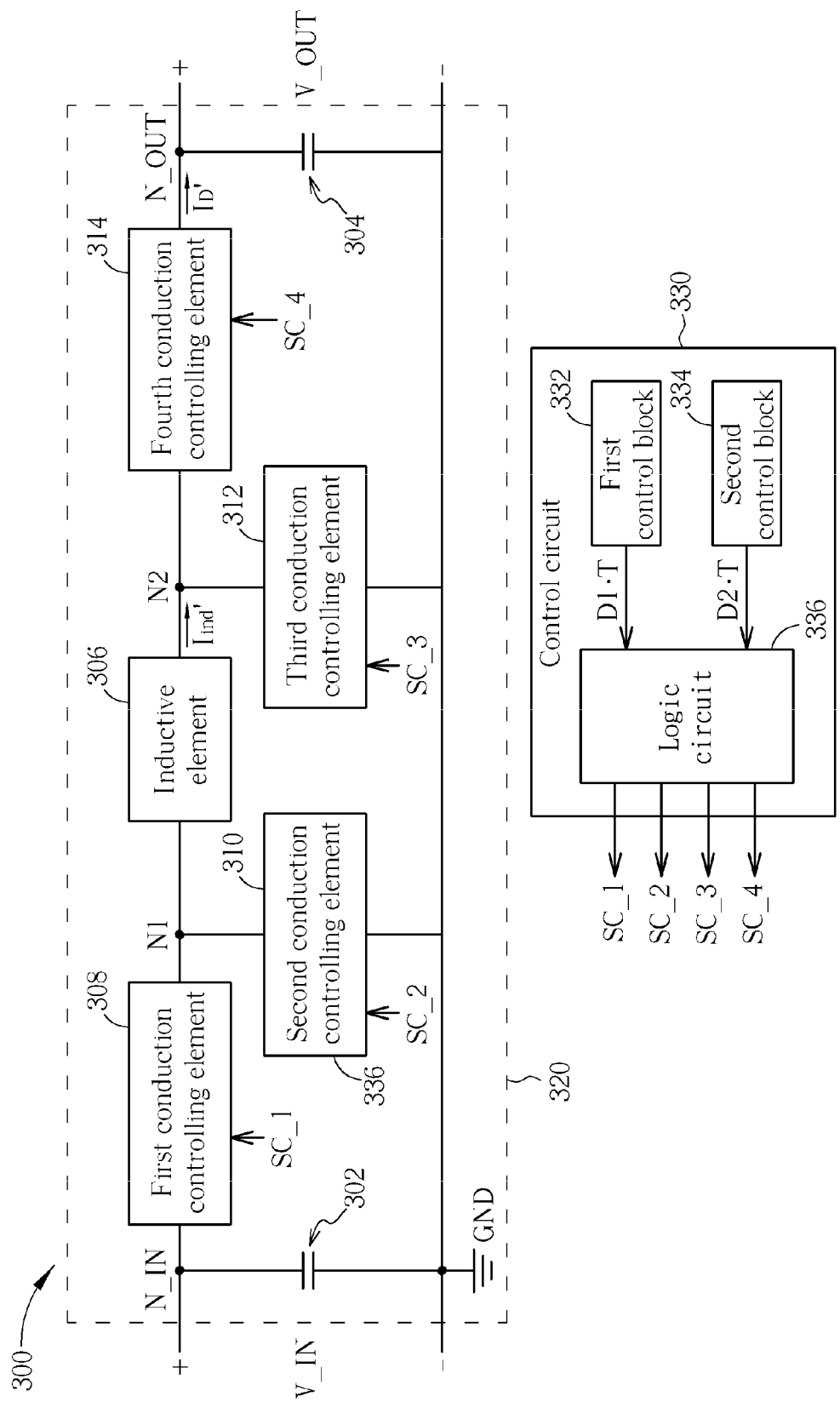
FIG. 3 is a diagram of a buck-boost converter according to an exemplary embodiment of the present invention.

FIG. 3 is a diagram of a buck-boost converter 300 according to an exemplary embodiment of the present invention. The exemplary buck-boost converter 300 operates according to an exemplary control method of the present invention, and includes a buck-boost converting circuit 320 and a control circuit 330, where the control circuit 330 is configured for performing the exemplary control method to thereby control the buck-boost converting circuit 320 to supply a regulated output voltage V_OUT at an output node N_OUT according to an input voltage V_IN received at an input node N_IN. The buck-boost converting circuit 320 includes, but is not limited to, an input capacitor 302, an output capacitor 304, an inductive element (e.g., an inductor) 306, a first conduction controlling element 308, a second conduction controlling element 310, a third conduction controlling element 312, and a fourth conduction controlling element 314. The voltage difference between one terminal of the input capacitor 302 and the ground terminal GND is equal to the magnitude of the input voltage VIN, and the voltage difference between one terminal of the output capacitor 304 and the ground terminal GND is equal to the magnitude of the regulated output voltage V_OUT. The first conduction controlling element 308 is coupled between the input node N_IN of the buck-boost converting circuit 320 and a first terminal N1 of the inductive element 306. The second conduction controlling element 310 is coupled between the first terminal N1 of the inductive element 306 and a reference voltage node (e.g., the ground terminal GND). The third conduction controlling element 312 is coupled between a second terminal N2 of the inductive element 306 and the reference voltage node (e.g., the ground terminal GND). The fourth conduction controlling element 314 is coupled between the second terminal N2 of the inductive element 306 and the output node N_OUT of the buck-boost converting circuit 320.

In one exemplary configuration of the buck-boost converting circuit 320, all of the conduction controlling elements, including 308, 310, 312, and 314, may be implemented using switches, such as metal-oxide semiconductor (MOS) transistors. In another exemplary configuration of the buck-boost converting circuit 320, the first conduction controlling element 308 and the third conduction controlling element 312 may be implemented using switches (e.g., MOS transistors), and the second conduction controlling element 310 and the fourth conduction controlling element 314 may be implemented using diodes. By way of example, but not limitation, the second conduction controlling element 310 is implemented by a diode with an anode coupled to the ground terminal GND and a cathode coupled to the first terminal N1, and the fourth conduction controlling element 314 is implemented by a diode with an anode coupled to the second terminal N2 and a cathode coupled to the output node N_OUT. The same objective of generating the regulated output voltage V_OUT can be achieved by such a hardware configuration.

In this exemplary embodiment, the control circuit 330 includes, but is not limited to, a first control block 332, a second control block 334, and a logic circuit 336. The first control block 332 is operative to determine a first duty setting (e.g., D1*T, where D1 is a weighting parameter and T is a time period length), and the second control block 334 is operative to determine a second duty setting (e.g., D2*T, where D2 is a weighting parameter and T is the time period length). The generation of the second duty setting D2*T may be independent of the generation of the first duty setting D1*T; more specifically, the first control block 332 determines the first duty setting D1*T according to current flowing through the first conduction controlling element 308 or the inductive element 306 and/or according to a feedback voltage derived from the regulated output voltage V_OUT; the second control block 334 may determine the second duty setting D2*T without referring to at least the feedback voltage derived from the regulated output voltage V_OUT. The logic circuit 336 is coupled to the first control block 332 and the second control block 334, and employed for receiving the first duty setting D1*T and the second first duty setting D2*T and then generating control signals SC_1, SC_2, SC_3, and SC_4 to the respective conduction controlling elements, including 308, 310, 312, and 314, according to at least the first duty setting D1*T and second first duty setting D2*T. By way of example, but not limitation, the logic circuit 336 under one operational scenario controls the buck-boost converting circuit 320 to enter a first phase Phase_1, a second phase Phase_2 and a third phase Phase_3, sequentially. In the first phase Phase_1 of the buck-boost converting circuit 320, the logic circuit 336 controls the first conduction controlling element 308 and the third conduction controlling element 312 to be electrically conductive and controlling the second conduction controlling element 310 and the fourth conduction controlling element 314 to be electrically nonconductive according to the first duty setting D1*T. In the second phase Phase_2 of the buck-boost converting circuit 320, the logic circuit 336 controls the first conduction controlling element 308 and the fourth conduction controlling element 314 to be electrically conductive and controlling the second conduction controlling element 310 and the third conduction controlling element 312 to be electrically nonconductive according to the second duty setting D2*T. In the third phase Phase_3 of the buck-boost converting circuit 320, the logic circuit 336 controls the second conduction controlling element 310 and the fourth conduction controlling element 314 to be electrically conductive and controlling the first conduction controlling element 308 and the third conduction controlling element 312 to be electrically nonconductive according to a third duty setting, such as (1−D1−D2)*T which is based on the first duty setting D1*T and the second duty setting D2*T. The sequence order of the first duty setting D1*T, the second duty setting D2*T, and the third duty setting (1−D1−D2)*T within one time period T is shown in FIG. 4.

Figure 1:
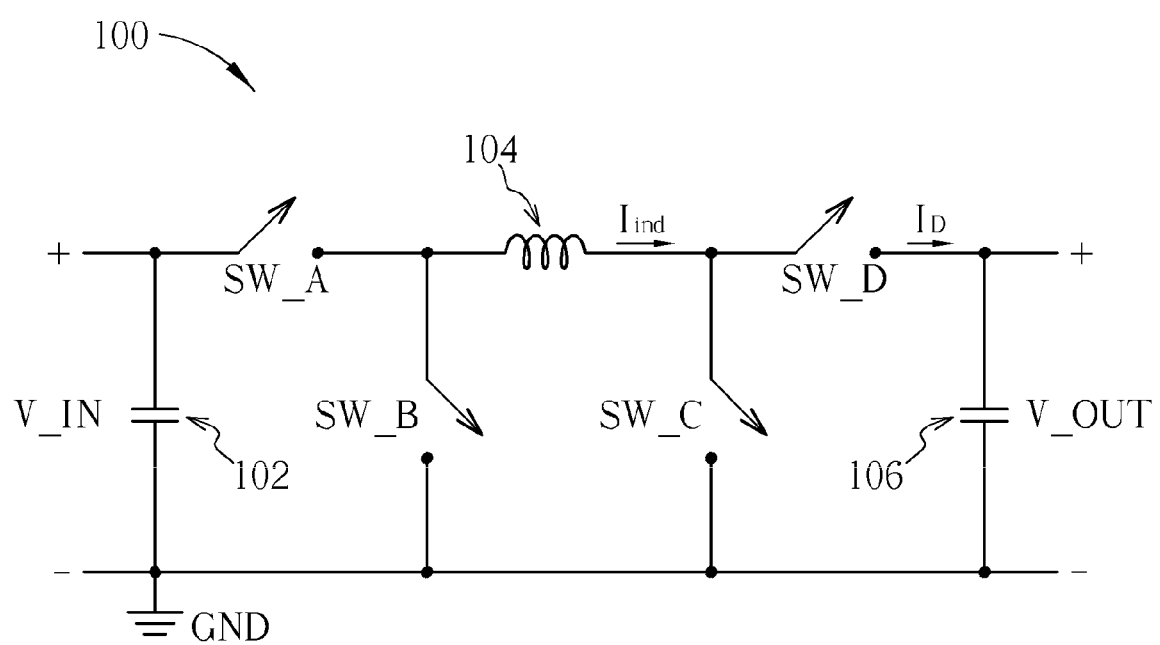
FIG. 1 is a diagram illustrating a conventional buck-boost converting circuit.
Figure 2:
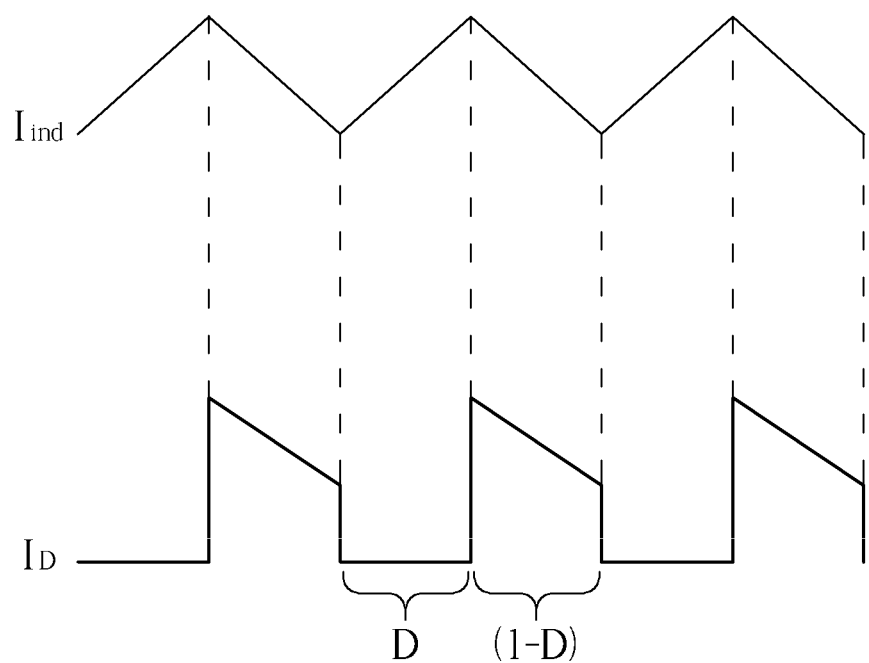
FIG. 2 is a waveform diagram illustrating the inductor current and the switch current shown in FIG. 1.
Figure 4:
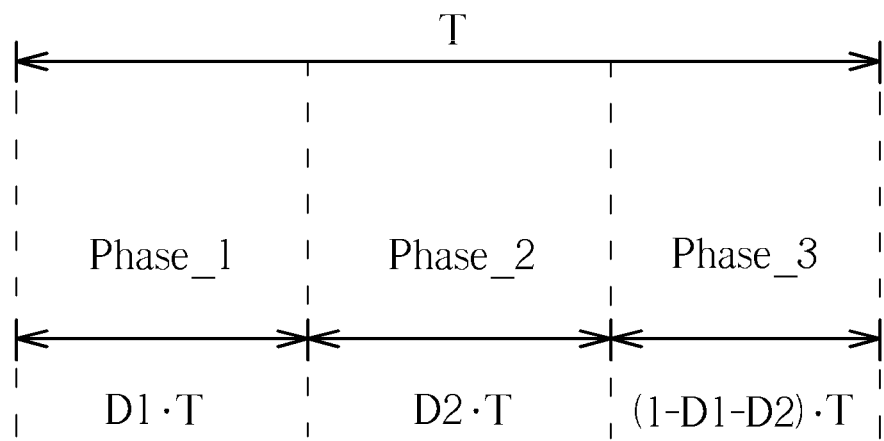
FIG. 4 is a diagram illustrating the sequence order of the first duty setting, the second duty setting, and the third duty setting within one period.
Figure 5:
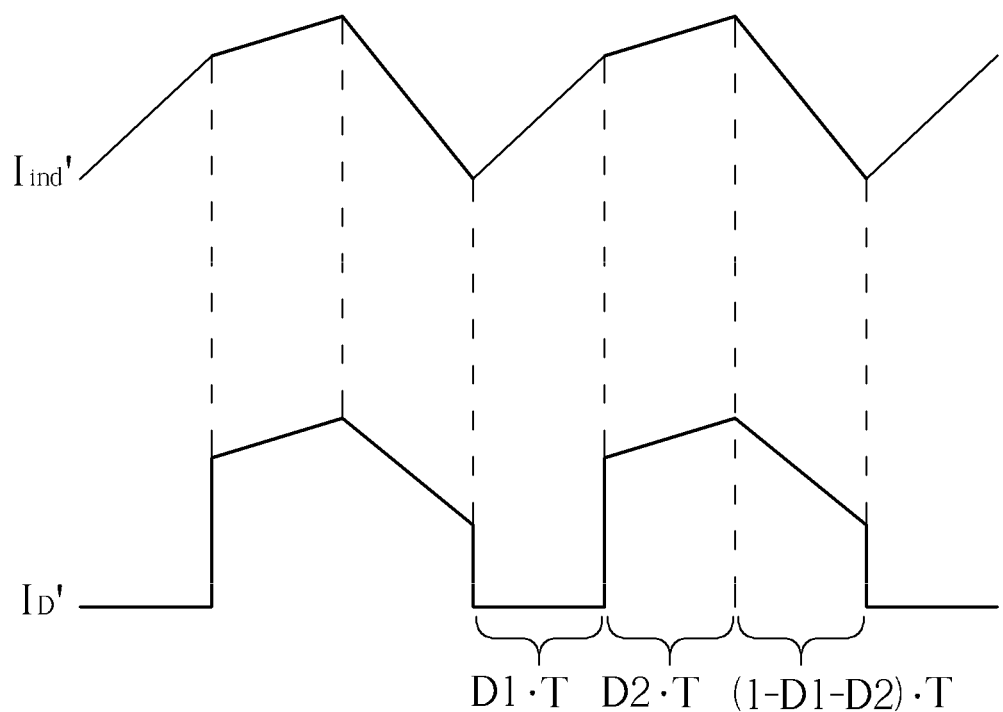
FIG. 5 is a waveform diagram illustrating the inductor current and the switch current shown in FIG. 3.

Compared with the conventional control design of the buck-boost converting circuit 100 shown in FIG. 1, at least one additional phase (i.e., the second phase Phase_2) is inserted between the first phase Phase_1 and the third phase Phase_3, as can be seen from FIG. 4. Therefore, the fourth conduction controlling element 314 would be electrically conductive during the second phase Phase_2 as well as the third phase Phase_3. In this way, the exemplary control circuit 330 allows the fourth conduction controlling element 314 to have a longer current conduction period, leading to improved conversion efficiency. FIG. 5 is a waveform diagram illustrating the inductor current Ind' of the inductive element 306 and the current $I_D$' of the fourth conduction controlling element 314. Due to the fourth conduction controlling element 314 being electrically conductive during both the second and third phases Phase_2 and Phase_3, the average inductor current with lowered current value can supply the desired output current to an output load. Specifically, the regulated output voltage V_OUT and the input voltage V_IN have the following transfer function: V_OUT/V_IN= (D1+D2)/(1−D1); and the relation between the average inductor current $I_{AVG, L}$' of the inductive element 306 and the average current $I_{AVG, SW-D}$' of the fourth conduction controlling element 314 can be expressed using the following equation: $I_{AVG, SW-D}' = I_{AVG, L}'*(1-D1)$. In a case where V_OUT/V_IN=3.3V/3.3V, and the required output current is 300 mA, the turn-on duty D1 is about 25%, and the average inductor current $I_{AVG, L}$' will be about 400 mA, which is much smaller than 600 mA under the conventional buck-boost converter design. By utilizing the proposed control approach, the average inductor current will be greatly reduced, and the conversion efficiency can be improved accordingly due to less power loss.

It should be noted that the current profile shown in FIG. 5 is for illustrative purposes only. Actually, the current profile may vary according to different operational statuses under the buck-boost mode. In other words, the turn-on duty D1 and the inserted programmable turn-on duty D2 decide the final current profile of the inductor current and switch current. To put it simply, as long as the additional second phase mentioned above is inserted between the first phase and the third phase (please note that the conventional buck-boost converting circuit has these two phases only), the average inductor current can be effectively reduced.

Figure 6:
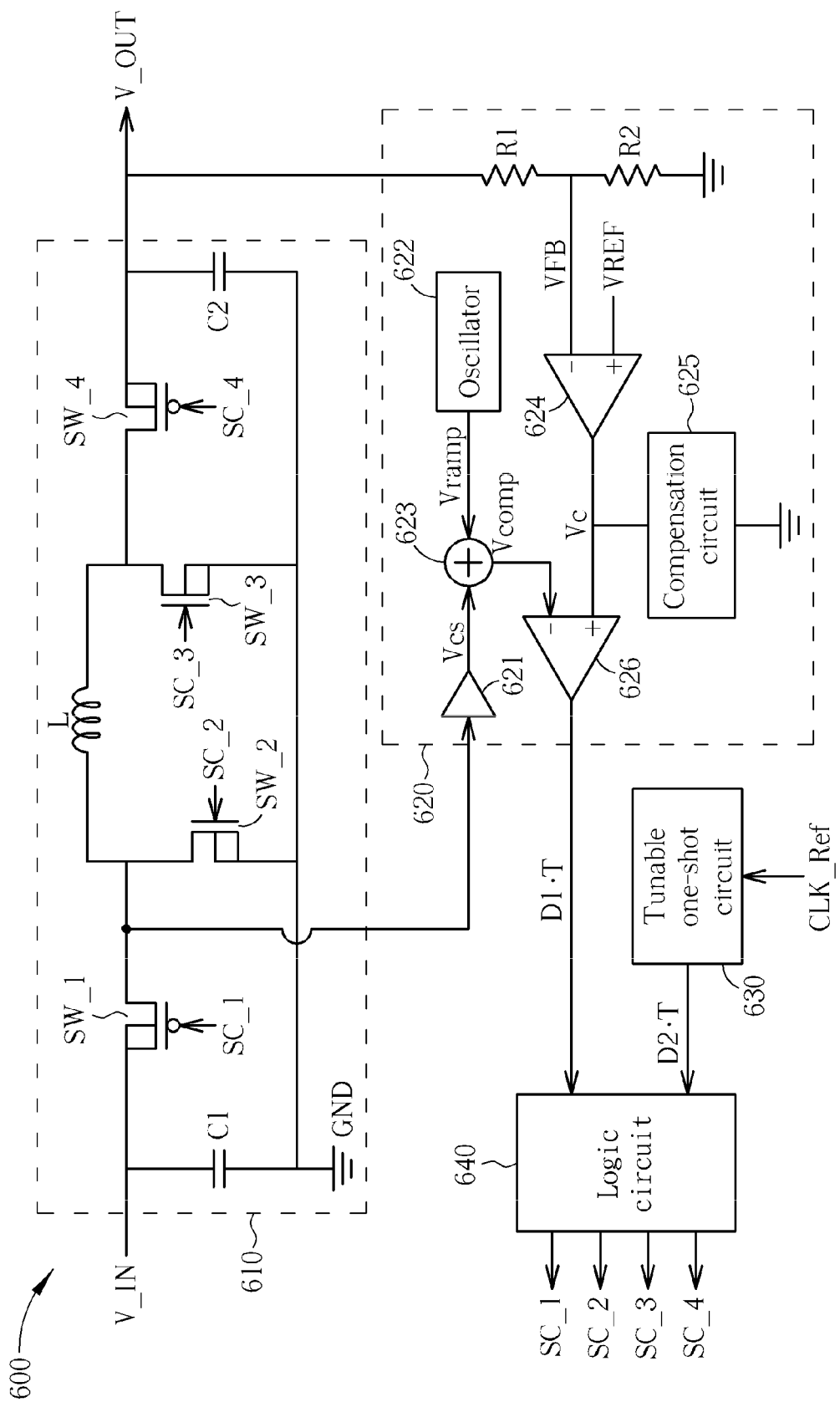
FIG. 6 is a diagram illustrating a first exemplary implementation of the buck-boost converter shown in FIG. 3.

Please refer to FIG. 3 in conjunction with FIG. 6. FIG. 6 is a diagram illustrating a first exemplary implementation of the buck-boost converter 300 shown in FIG. 3. In this exemplary implementation, the buck-boost converter 600 includes a buck-boost converting circuit 610 having an inductor L, an input capacitor C1, an output capacitor C2, and a plurality of switches SW1_1, SW_2, SW_3, SW_4 implemented using MOS transistors controlled by control signals SC_1, SC_2, SC_3, SC_4, respectively. As a person skilled in the art can readily understand the exemplary buck-boost converting circuit configuration shown in FIG. 6 after reading above paragraphs directed to the buck-boost converting circuit 320 in FIG. 3, further description is omitted here for brevity.

The first control block 620 employs a current programmed mode (CPM) control which monitors the current flowing through the switch SW_1 or the inductor L to program the first duty setting D1*T. In this exemplary implementation, the switch/inductor current is sensed by the current sensing unit (e.g., a current transformer, sense resistor, or any element with current sensing capability) 621. Therefore, the current sensing unit 621 generates a sensed voltage $V_{cs}$ proportional to the actual current flowing through the switch SW_1/inductor L. The control signal of a current-mode converter that controls the generation of the regulated output voltage using the inductor current/switch current is sensitive to disturbance. When the buck-boost converter is operating with a duty of 50% or less, the disturbance does not affect overall converter operation. However, at a duty greater than 50%, the effect of disturbance becomes significant, which may result in oscillation of the control signal. In order to prevent such oscillation caused by disturbance, a compensating sawtooth ramp signal $V_{ramp}$ with a certain slope is generated from an oscillator 622, and then combined with the sensed voltage $V_{cs}$ generated from the current sensing unit 621 through an adder 623 to stabilize the loop, thereby producing a waveform signal $V_{comp}$. Resistors R1 and R2 form a voltage divider to generate a feedback voltage VFB according to the regulated output voltage V_OUT. The comparator 624 compares the feedback voltage VFB with a reference voltage VREF to generate a control voltage $V_c$. Next, the control voltage Vc compensated by a compensation unit (e.g., a proportional and integral (PI) compensator) 625 is compared with the waveform signal $V_{comp}$ through a comparator 626. In the end, the first duty setting D1*T is determined according to a comparison result of the comparator 626. Briefly summarized, the CPM control tunes the first duty setting D1*T according to the magnitude of the regulated output voltage and the magnitude of the inductor/switch current. Compared with voltage-mode control which monitors the magnitude of the regulated output voltage only, the CPM control has outstanding advantages including easy compensation with large phase margin, simpler dynamics due to inductor pole moved to high frequency, faster transient response, and prevention of over-current failure due to the necessary current sensing operation.

In this exemplary implementation, the second control block 334 in FIG. 3 is realized by a tunable one-shot circuit 630 which determines the second duty setting D2*T by processing a reference clock signal CLK_Ref with a designated reference switching period. That is, by properly setting the designated reference switching period of the reference clock signal CLK_Ref, the second duty setting D2*T will be programmed to have a desired value satisfying the application requirement as the second duty setting D2*T is proportional to the designated reference switching period of the reference clock signal CLK_Ref.

Based on the first duty setting D1*T and the second duty setting D2*T, the logic circuit 640 generates the control signals SC_1, SC_2, SC_3, SC_4 for controlling the buck-boost converting circuit 610 to enter different phases (e.g., Phase_1, Phase_2, and Phase_3), sequentially. In the end, the desired output voltage V_OUT can be generated from the buck-boost converting circuit 610 under a conduction of a reduced average inductor current.

Figure 7:
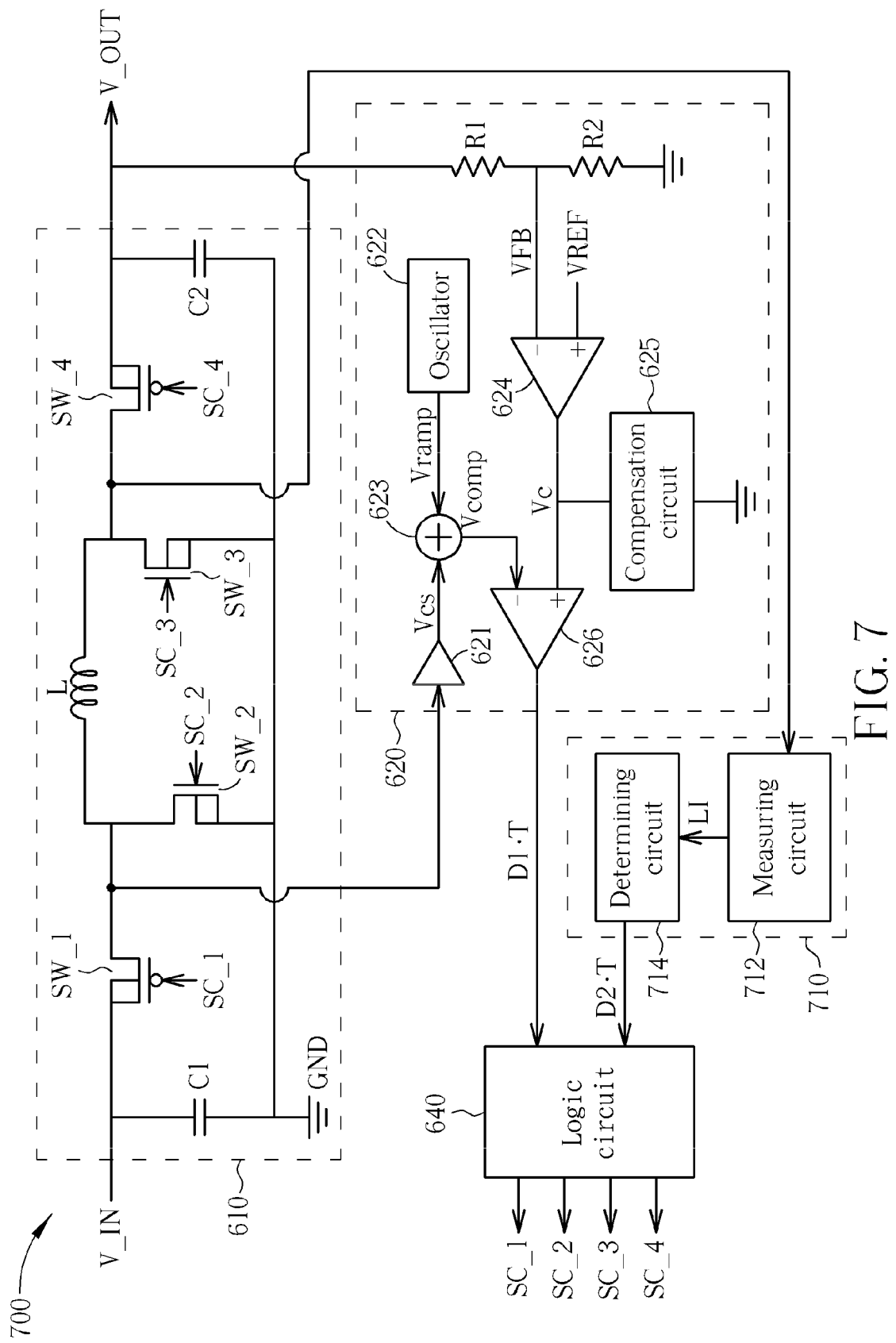
FIG. 7 is a diagram illustrating a second exemplary implementation of the buck-boost converter shown in FIG. 3.

Please refer to FIG. 3 in conjunction with FIG. 7. FIG. 7 is a diagram illustrating a second exemplary implementation of the buck-boost converter 300 shown in FIG. 3. In this exemplary implementation, the buck-boost converter 700 includes the buck-boost converting circuit 610, the first control block 620, a second control block 710, and the logic circuit 640. The major difference between the exemplary buck-boost converter 600 in FIG. 6 and the exemplary buck-boost converter 700 in FIG. 7 is the implementation of the second control block. As shown in FIG. 7, the second control block 710 includes a measuring circuit 712 and a determining circuit 714. The measuring circuit 712 is for measuring the output loading of the buck-boost converting circuit 612 to obtain output loading information LI. In this exemplary implementation, the measuring circuit 712 obtains the output loading information LI of the buck-boost converting circuit 610 by measuring charges passing through the switch SW_4 which realizes the fourth conduction controlling element 314 as shown in FIG. 3. In another implementation, the measuring circuit 712 obtains the output loading information L1 of the buck-boost converting circuit 610 by detecting the frequency of the oscillator 622. The determining circuit 714 is coupled to the measuring circuit 712, and utilized for determining the second duty setting D2*T according to the output loading information L1. It should be noted that in this exemplary implementation, when the average output loading is increased, the inserted programmable turn-on duty will be increased, and vice versa. Besides, the updating frequency of the second duty setting D2*T depends on the design consideration, and is therefore adjustable.

It should be noted that determining the second duty setting D2*T according to the switching period of a reference clock or the output loading information of the buck-boost converting circuit is for illustrative purposes only, and is not meant to be a limitation to the scope of the present invention. Specifically, any means capable of determining the second duty setting D2*T whose generation is independent of the generation of the first duty setting D1*T (i.e., the duty of Phase_2 is independent of the control signal for controlling the duty of Phase_1) or without referring to at least a feedback voltage derived from the regulated output voltage V_OUT can be employed by the second control block. These alternative designs all obey the spirit of the present invention.

Figure 8:
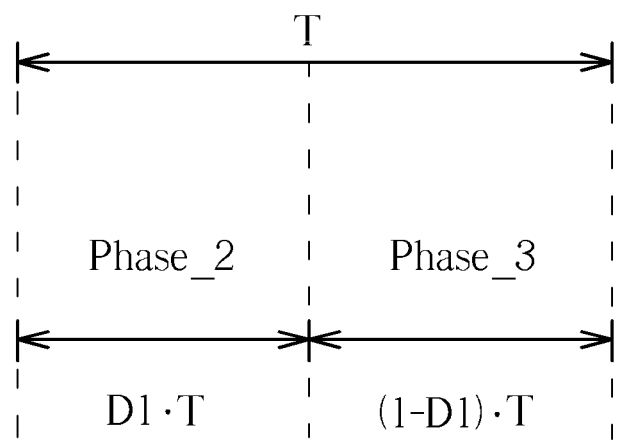
FIG. 8 is a diagram illustrating the sequence order of the second duty setting and the third duty setting within one period.

Considering a particular case where the output current is lower than required, the buck-boost converting circuit 320, 610 will enter a power-saving mode by skipping the first phase Phase1 (i.e., keeping the fourth conduction controlling element 314 (switch SW_4) electrically conductive and the third conduction controlling element 312 (switch SW_3) electrically nonconductive under the power-saving mode). The aforementioned second duty setting D2*T for the second phase Phase_2 is therefore controlled by the first control block 332, 620, rather than the switching period of a reference clock or the output loading information of the buck-boost converting circuit. In other words, D2*T=D1*T when Phase_1 disappears under the power-saving mode. The sequence order of the second duty setting D1*T and the third duty setting (1−D1)*T within one time period T is shown in FIG. 8. It should be noted that as Phase1 disappears, the buck-boost converting circuit 320, 610 works like a buck converter.

The exemplary buck-boost converter employing the proposed control method of the present invention uses an easy way to reduce the average inductor current, improves the power efficiency greatly, and requires smaller input capacitor due to lower current passing through the first conduction controlling element (e.g., a switch implemented using a MOS transistor) 308; additionally, it is convenient to be implemented in target applications. By way of example, the exemplary buck-boost converter with the proposed control design of the present invention may be applied to any handheld instrument which supports a wide input voltage range, for providing a regulated output voltage above, below or equal to the input voltage with high conversion efficiency.

Those skilled in the art will readily observe that numerous modifications and alterations of the device and method may be made while retaining the teachings of the invention.

What is claimed is:

1. A method of controlling a buck-boost converting circuit to supply a regulated output voltage at an output node of the buck-boost converting circuit, the buck-boost converting circuit comprising an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node, the method comprising:

controlling the first conduction controlling element and the third conduction controlling element to be electrically conductive and controlling the second conduction controlling element and the fourth conduction controlling element to be electrically nonconductive according to a first duty setting;

determining a second duty setting, wherein generation of the second duty setting is independent of generation of the first duty setting;

controlling the first conduction controlling element and the fourth conduction controlling element to be electrically conductive and controlling the second conduction controlling element and the third conduction controlling element to be electrically nonconductive according to the second duty setting; and controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

2. The method of claim 1, wherein the step of determining the second duty setting comprises:

receiving a reference clock signal with a reference switching period; and determining the second duty setting according to the reference switching period.

3. The method of claim 2, wherein the step of determining the second duty setting according to the reference switching period comprises:

determining the second duty setting by utilizing a one-shot circuit to process the reference clock signal with the reference switching period.

4. The method of claim 1, wherein the step of determining the second duty setting comprises:

measuring an output loading of the buck-boost converting circuit to obtain output loading information; and determining the second duty setting according to the output loading information.

5. The method of claim 4, wherein the step of measuring the output loading of the buck-boost converting circuit comprises:

measuring charges passing through the fourth conduction controlling element to obtain the output loading information.

6. The method of claim 1, wherein the third duty setting is determined based on the first duty setting and the second duty setting only.

7. A method of controlling a buck-boost converting circuit to supply a regulated output voltage at an output node of the buck-boost converting circuit, the buck-boost converting circuit comprising an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node, the method comprising:

controlling the first conduction controlling element and the third conduction controlling element to be electrically conductive and controlling the second conduction controlling element and the fourth conduction controlling element to be electrically nonconductive according to a first duty setting;

determining a second duty setting without referring to at least a feedback voltage derived from the regulated output voltage;

controlling the first conduction controlling element and the fourth conduction controlling element to be electrically conductive and controlling the second conduction controlling element and the third conduction controlling element to be electrically nonconductive according to the second duty setting; and controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

8. The method of claim 7, wherein the step of determining the second duty setting according to the reference switching period comprises:

determining the second duty setting by utilizing a one-shot circuit to process the reference clock signal with the reference switching period.

9. The method of claim 7, wherein the step of determining the second duty setting comprises:

measuring an output loading of the buck-boost converting circuit to obtain output loading information; and determining the second duty setting according to the output loading information.

10. The method of claim 9, wherein the step of measuring the output loading of the buck-boost converting circuit comprises:

measuring charges passing through the fourth conduction controlling element to obtain the output loading information.

11. The method of claim 7, wherein the third duty setting is determined based on the first duty setting and the second duty setting only.

12. The method of claim 7, wherein the step of determining the second duty setting comprises:

receiving a reference clock signal with a reference switching period; and determining the second duty setting according to the reference switching period.

13. A control circuit for controlling a buck-boost converting circuit to supply a regulated output voltage at an output node of the buck-boost converting circuit, the buck-boost converting circuit comprising an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node, the control circuit comprising:

a first control block, operative to determine a first duty setting;

a second control block, operative to determine a second duty setting, wherein generation of the second duty setting is independent of generation of the first duty setting; and a logic circuit, coupled to the first control block and the second control block, for receiving the first duty setting and the second duty setting, controlling the first conduction controlling element and the third conduction controlling element to be electrically conductive and controlling the second conduction controlling element and the fourth conduction controlling element to be electrically nonconductive according to the first duty setting, controlling the first conduction controlling element and the fourth conduction controlling element to be electrically conductive and controlling the second conduction controlling element and the third conduction controlling element to be electrically nonconductive according to the second duty setting, and controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

14. The control circuit of claim 13, wherein the second control block determines the second duty setting by:

measuring an output loading of the buck-boost converting circuit to obtain output loading information; and determining the second duty setting according to the output loading information.

15. The control circuit of claim 14, wherein the second control block comprises:

a measuring circuit for obtaining the output loading of the buck-boost converting circuit by measuring charges passing through the fourth conduction controlling element; and a determining circuit, coupled to the measuring circuit, for determining the second duty setting according to the output loading information.

16. The control circuit of claim 13, wherein the third duty setting is determined based on the first duty setting and the second duty setting only.

17. The control circuit of claim 13, wherein the second control block determines the second duty setting by:

receiving a reference clock signal with a reference switching period; and determining the second duty setting according to the reference switching period.

18. The control circuit of claim 17, wherein the second control block includes a one-shot circuit for determining the second duty setting by processing the reference clock signal with the reference switching period.

19. A control circuit for controlling a buck-boost converting circuit to supply a regulated output voltage at an output node of the buck-boost converting circuit, the buck-boost converting circuit comprising an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node, the control circuit comprising:

a first control block, operative to determine a first duty setting;

a second control block, operative to determine a second duty setting without referring to at least a feedback voltage derived from the regulated output voltage; and a logic circuit, coupled to the first control block and the second control block, for receiving the first duty setting and the second duty setting, controlling the first conduction controlling element and the third conduction controlling element to be electrically conductive and controlling the second conduction controlling element and the fourth conduction controlling element to be electrically nonconductive according to the first duty setting, controlling the first conduction controlling element and the fourth conduction controlling element to be electrically conductive and controlling the second conduction controlling element and the third conduction controlling element to be electrically nonconductive according to the second duty setting, and controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

20. The control circuit of claim 19, wherein the second control block determines the second duty setting by:
   receiving a reference clock signal with a reference switching period; and
   determining the second duty setting according to the reference switching period.

21. The control circuit of claim 19, wherein the second control block includes a one-shot circuit for determining the second duty setting by processing the reference clock signal with the reference switching period.

22. The control circuit of claim 19, wherein the second control block determines the second duty setting by:
   measuring an output loading of the buck-boost converting circuit to obtain output loading information; and
   determining the second duty setting according to the output loading information.

23. The control circuit of claim 22, wherein the second control block comprises:
   a measuring circuit for obtaining the output loading of the buck-boost converting circuit by measuring charges passing through the fourth conduction controlling element; and
   a determining circuit, coupled to the measuring circuit, for determining the second duty setting according to the output loading information.

24. The control circuit of claim 19, wherein the third duty setting is determined based on the first duty setting and the second duty setting only.

25. A method of controlling a buck-boost converting circuit to supply a regulated output voltage at an output node of the buck-boost converting circuit, the buck-boost converting circuit comprising an inductive element, a first conduction controlling element coupled between an input node of the buck-boost converting circuit and a first terminal of the inductive element, a second conduction controlling element coupled between the first terminal of the inductive element and a reference voltage node, a third conduction controlling element coupled between a second terminal of the inductive element and the reference voltage node, and a fourth conduction controlling element coupled between the second terminal of the inductive element and the output node, the method comprising:
   determining a first duty setting according to current flowing through the first conduction controlling element or the inductive element;
   controlling the first conduction controlling element and the third conduction controlling element to be electrically conductive and controlling the second conduction controlling element and the fourth conduction controlling element to be electrically nonconductive according to the first duty setting;
   determining a second duty setting;
   controlling the first conduction controlling element and the fourth conduction controlling element to be electrically conductive and controlling the second conduction controlling element and the third conduction controlling element to be electrically nonconductive according to the second duty setting; and
   controlling the second conduction controlling element and the fourth conduction controlling element to be electrically conductive and controlling the first conduction controlling element and the third conduction controlling element to be electrically nonconductive according to a third duty setting which is based on the first duty setting and the second duty setting.

26. The method of claim 25, wherein the third duty setting is determined based on the first duty setting and the second duty setting only.

* * * * *